United States Patent
Wisgo

(10) Patent No.: US 11,029,809 B2
(45) Date of Patent: Jun. 8, 2021

(54) SYSTEM FOR DISPLAYING ELECTRONIC MAIL METADATA AND RELATED METHODS

(71) Applicant: CITRIX SYSTEMS, INC., Ft. Lauderdale, FL (US)

(72) Inventor: Jeffrey David Wisgo, Portland, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 223 days.

(21) Appl. No.: 15/976,411

(22) Filed: May 10, 2018

(65) Prior Publication Data
US 2019/0346990 A1     Nov. 14, 2019

(51) Int. Cl.
    *G06F 3/0481*      (2013.01)
    *H04L 12/58*       (2006.01)
    *G06Q 10/10*       (2012.01)

(52) U.S. Cl.
    CPC ....... *G06F 3/04817* (2013.01); *G06Q 10/107* (2013.01); *H04L 51/04* (2013.01); *H04L 51/12* (2013.01); *H04L 51/22* (2013.01); *H04L 51/34* (2013.01)

(58) Field of Classification Search
    CPC ......... H04L 51/04; H04L 51/12; H04L 51/22; H04L 51/34; G06F 3/04817; G06Q 10/107
    See application file for complete search history.

(56) References Cited

U.S. PATENT DOCUMENTS

| | | | |
|---|---|---|---|
| 7,124,164 B1* | 10/2006 | Chemtob | G06Q 10/10 709/204 |
| 8,302,015 B2* | 10/2012 | Krishnan | G06Q 10/10 715/747 |
| 8,332,782 B1* | 12/2012 | Chang | H04L 12/6418 715/853 |
| 8,767,012 B2 | 7/2014 | Gilger | |
| 9,438,551 B1* | 9/2016 | Devasthali | H04L 51/08 |
| 9,542,650 B2 | 1/2017 | Lospinoso et al. | |
| 9,699,129 B1* | 7/2017 | Nelken | H04L 51/26 |
| 2003/0126215 A1* | 7/2003 | Udell | G06F 21/10 709/206 |

(Continued)

OTHER PUBLICATIONS

Leuprecht, "Deception in Speeches of Candidates for Public Office", published on Aug. 2015, [Retrieved online] https://www.researchgate.net/publication/281275762 (Year: 2015).*

(Continued)

*Primary Examiner* — Tuyetlien T Tran
(74) *Attorney, Agent, or Firm* — Allen, Dyer, Doppelt + Gilchrist, PA

(57) ABSTRACT

A system for displaying electronic mail (email) metadata may include a display and a memory configured to store emails. The system may also include a processor coupled to the display and the memory. The processor may be configured to extract the email metadata from the emails and associate each email with an icon visually conveying respective email metadata for a corresponding email. The processor may also be configured to determine at least one icon display characteristic for each icon based upon the extracted email metadata and display, on the display, each icon with the at least one icon display characteristic.

16 Claims, 7 Drawing Sheets

(56) References Cited

U.S. PATENT DOCUMENTS

| | | | |
|---|---|---|---|
| 2003/0225879 A1* | 12/2003 | Chipchase | H04M 1/72519 709/224 |
| 2004/0153483 A1* | 8/2004 | Cox | H04L 51/38 |
| 2006/0253787 A1* | 11/2006 | Fogg | G06F 3/0481 715/752 |
| 2008/0163118 A1* | 7/2008 | Wolf | G06F 16/168 715/835 |
| 2008/0270560 A1* | 10/2008 | Tysowski | H04L 51/14 709/207 |
| 2010/0070593 A1* | 3/2010 | Sayers | G06Q 10/107 709/206 |
| 2010/0251177 A1* | 9/2010 | Geppert | H04M 1/27475 715/821 |
| 2011/0173553 A1* | 7/2011 | Karmon | G06T 11/206 715/767 |
| 2011/0212736 A1* | 9/2011 | Jaime | H04L 51/26 455/466 |
| 2012/0084707 A1* | 4/2012 | Abdel-Kader | H04M 1/2745 715/779 |
| 2013/0097566 A1* | 4/2013 | Berglund | G06F 3/04883 715/863 |
| 2013/0135314 A1* | 5/2013 | Haggerty | G06T 11/20 345/440 |
| 2013/0179453 A1* | 7/2013 | Bottum | G06F 3/0484 707/748 |
| 2014/0074862 A1* | 3/2014 | Bottum | G06F 16/9535 707/748 |
| 2014/0324999 A1* | 10/2014 | Dan | H04L 51/22 709/206 |
| 2014/0372446 A1* | 12/2014 | Bell | G06F 3/04817 707/740 |
| 2015/0032824 A1* | 1/2015 | Kumar | H04L 51/06 709/206 |
| 2015/0095315 A1* | 4/2015 | DeCrescenzo | G06F 16/444 707/722 |
| 2015/0281156 A1* | 10/2015 | Beausoleil | H04L 51/14 709/206 |
| 2015/0339373 A1* | 11/2015 | Carlson | G06F 16/287 707/737 |
| 2015/0350116 A1* | 12/2015 | Bhagwan | H04L 51/00 709/206 |
| 2015/0381543 A1* | 12/2015 | Hong | H04L 51/063 709/203 |
| 2016/0063112 A1* | 3/2016 | Bottum | G06F 16/9535 707/723 |
| 2016/0110828 A1* | 4/2016 | Master | G06Q 50/184 705/310 |
| 2016/0142359 A1* | 5/2016 | Lock | H04L 51/24 709/206 |
| 2016/0150575 A1* | 5/2016 | Andersen | H04W 76/10 370/329 |
| 2016/0170995 A1* | 6/2016 | Wiska | G06F 16/9535 707/728 |
| 2016/0285810 A1* | 9/2016 | Bai | H04L 51/16 |
| 2016/0366088 A1* | 12/2016 | Abou Mahmoud | H04L 51/30 |
| 2017/0026254 A1* | 1/2017 | Adylov | H04L 43/04 |
| 2017/0093778 A1* | 3/2017 | Jones | H04L 51/18 |
| 2018/0345145 A1* | 12/2018 | Okajima | A63F 13/65 |
| 2019/0281001 A1* | 9/2019 | Miller | H04L 51/22 |

OTHER PUBLICATIONS

Mandic et al. "Using intimacy, chronology and zooming to visualize rhythms in email experience" Conference Proceedings of CHI 2005, Apr. 2-7, 2005, Portland, Oregon, USA, ACM, Apr. 2, 2005; pp. 1617-1620.

Joorabchi et al. "EmailTime: visual analytics and statistics for temporal email" SPIE, vol. 7838: Jan. 24, 2011; pp. 11.

* cited by examiner

SYSTEM FOR DISPLAYING ELECTRONIC MAIL METADATA AND RELATED METHODS

TECHNICAL FIELD

The present embodiments are directed to the field of electronics, and more particularly, to visually representing electronic mail and related methods.

BACKGROUND

Electronic mail (email) may be considered a relatively widely used form of communication. For example, email may be a desirable and relatively easy form of corporate communications, both intra-company and inter-company. Consumer email usage may also be a particularly desirable form of communications. Within a company, for those in certain roles, for example, management, architects, and/or or customer support, over a hundred emails can be received within in a single day. Reading and responding to emails may involve a relatively large amount of time and mental effort.

An email client, for example, may help organize a user's email inbox. Through the user of an email client, emails may be filtered, tagged, and/or marked.

SUMMARY

A system for displaying electronic mail (email) metadata may include a display and a memory configured to store a plurality of emails. The system may also include a processor coupled the display and the memory. The processor may be configured to extract the email metadata from the plurality of emails and associate each email from the plurality thereof with an icon visually conveying respective email metadata for a corresponding email. The processor may also be configured to determine at least one icon display characteristic for each icon based upon the extracted email metadata and display, on the display, each icon with the at least one icon display characteristic.

The processor may be configured to update the at least one icon display characteristic over time, for example. The processor may be configured to display, on the display, a reference icon, and wherein the at least one icon display characteristic may include a position on the display relative to the reference icon.

The email metadata may include an email receipt time. The processor may be configured to set the position on the display of each icon relative to the reference icon based upon elapsed time since the email receipt time, for example.

The processor may be configured to update the position on the display of each icon relative to the reference icon over time based upon the email receipt time. The processor may be configured to update the position on the display of each icon to be closer to the reference icon over time, for example.

The email metadata may include an email sender, for example. The processor may be configured to update the position on the display of each icon relative to the reference icon based upon email sender, for example. The processor may be configured to update the position of a given icon to be closer to the reference icon at a rate based upon the email sender.

The email metadata may include at least one of subject, sender, email length, relationship to other emails, and keyword data, for example. The at least one icon display characteristic may include at least one of icon size, icon shape, icon color, and icon display position on the display, for example.

The plurality of emails may include a plurality of unread emails. The processor may be configured to remove from the display an icon associated with a given email upon the given email being marked as read.

A method aspect is directed to a method of displaying email metadata. The method may include using a processor and memory cooperating therewith to extract the email metadata from a plurality of emails stored in the memory. The processor may also be used to associate each email from the plurality thereof with an icon visually conveying respective email metadata for a corresponding email and determine at least one icon display characteristic for each icon based upon the extracted email metadata. The processor may further be used to display, on a display, each icon with the at least one icon display characteristic.

A computer readable medium aspect is directed to a non-transitory computer readable medium for displaying email metadata. The non-transitory computer readable medium includes computer executable instructions that when executed by a processor cause the processor to perform operations. The operations may include extracting the email metadata from a plurality of emails stored in a memory coupled to the processor and associating each email from the plurality thereof with an icon visually conveying respective email metadata for a corresponding email. The operations may also include determining at least one icon display characteristic for each icon based upon the extracted email metadata, and displaying, on a display, each icon with the at least one icon display characteristic.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
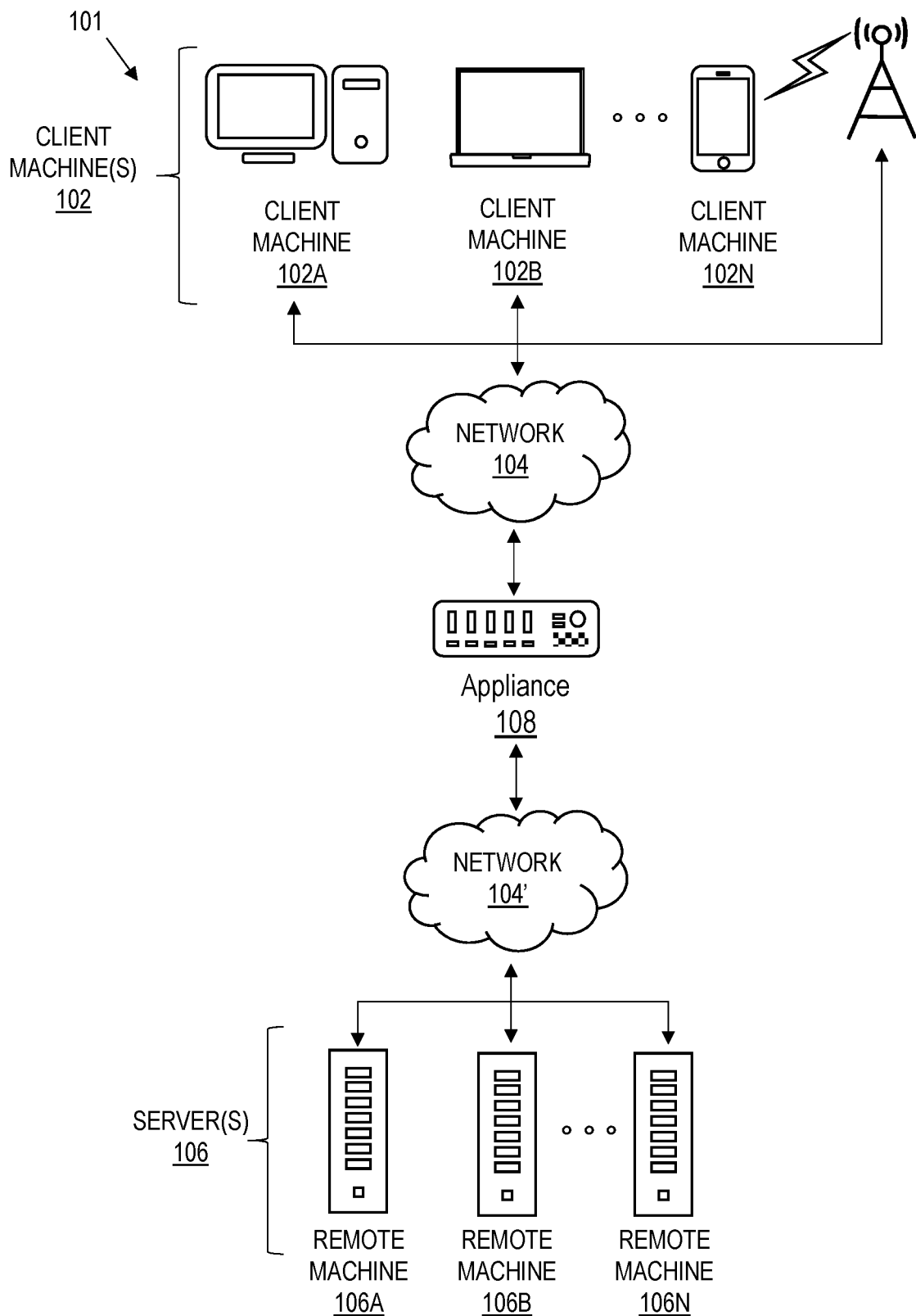
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
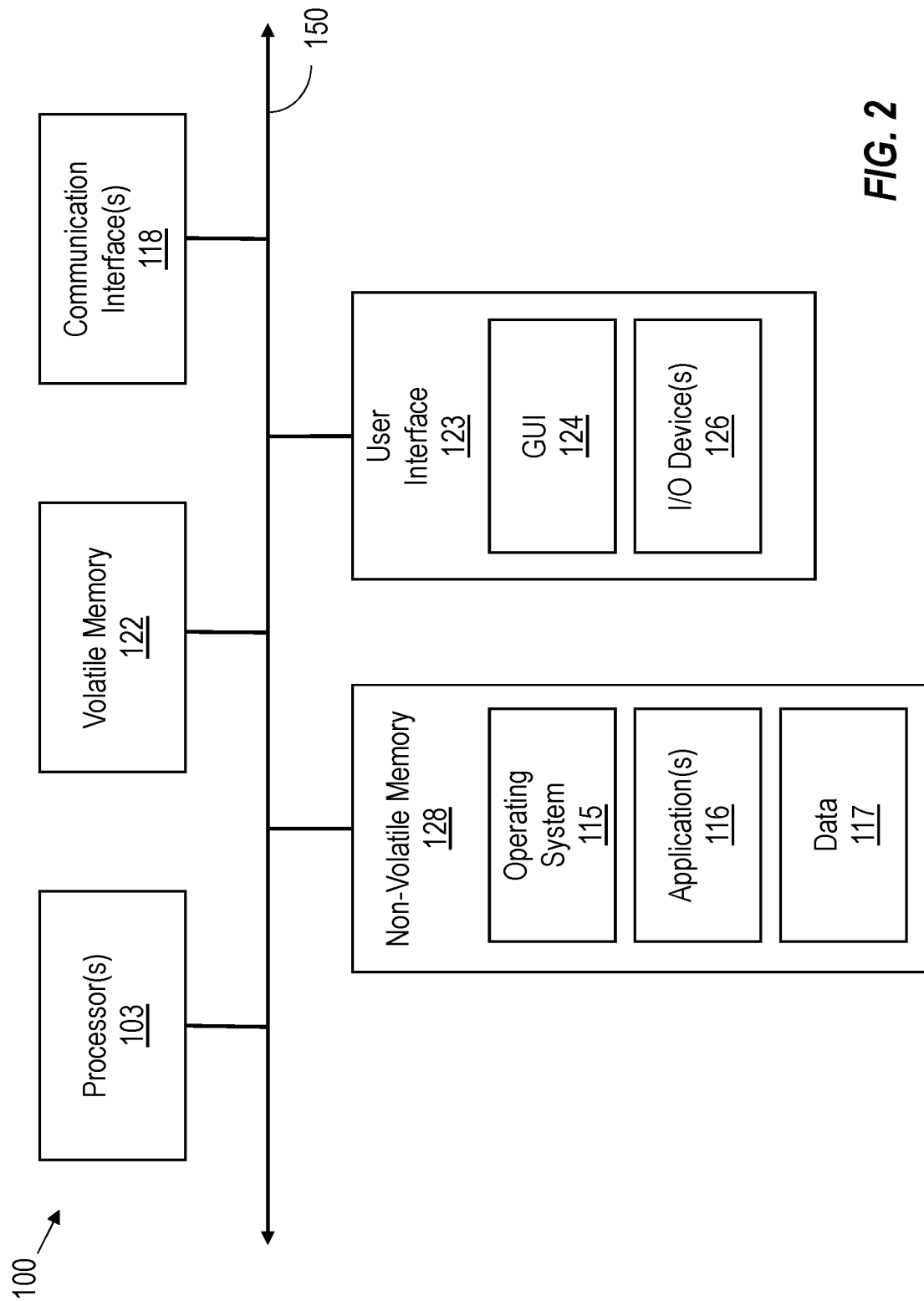
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute. Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
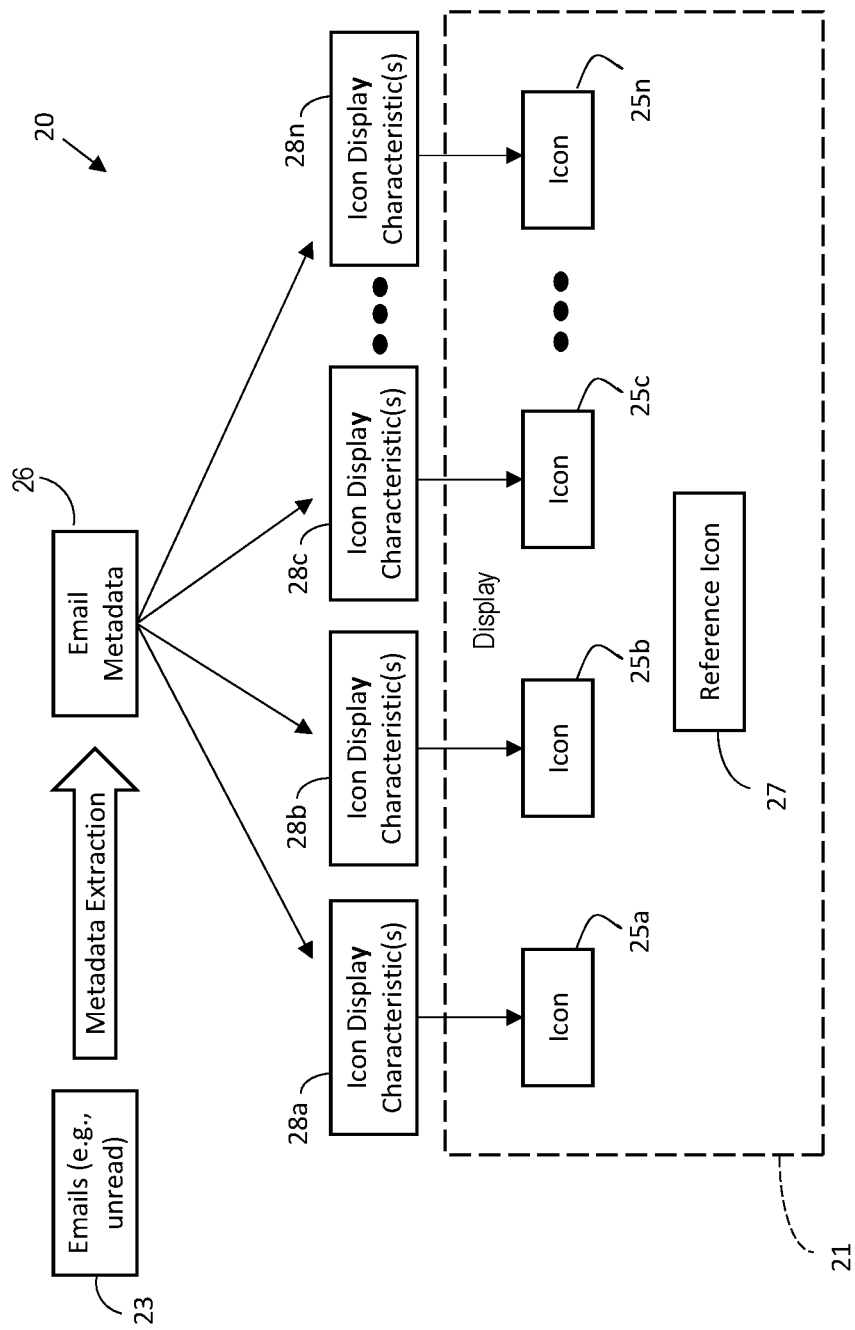
FIG. 3 is schematic diagram of a system for displaying email metadata according to an embodiment.
Figure 4:
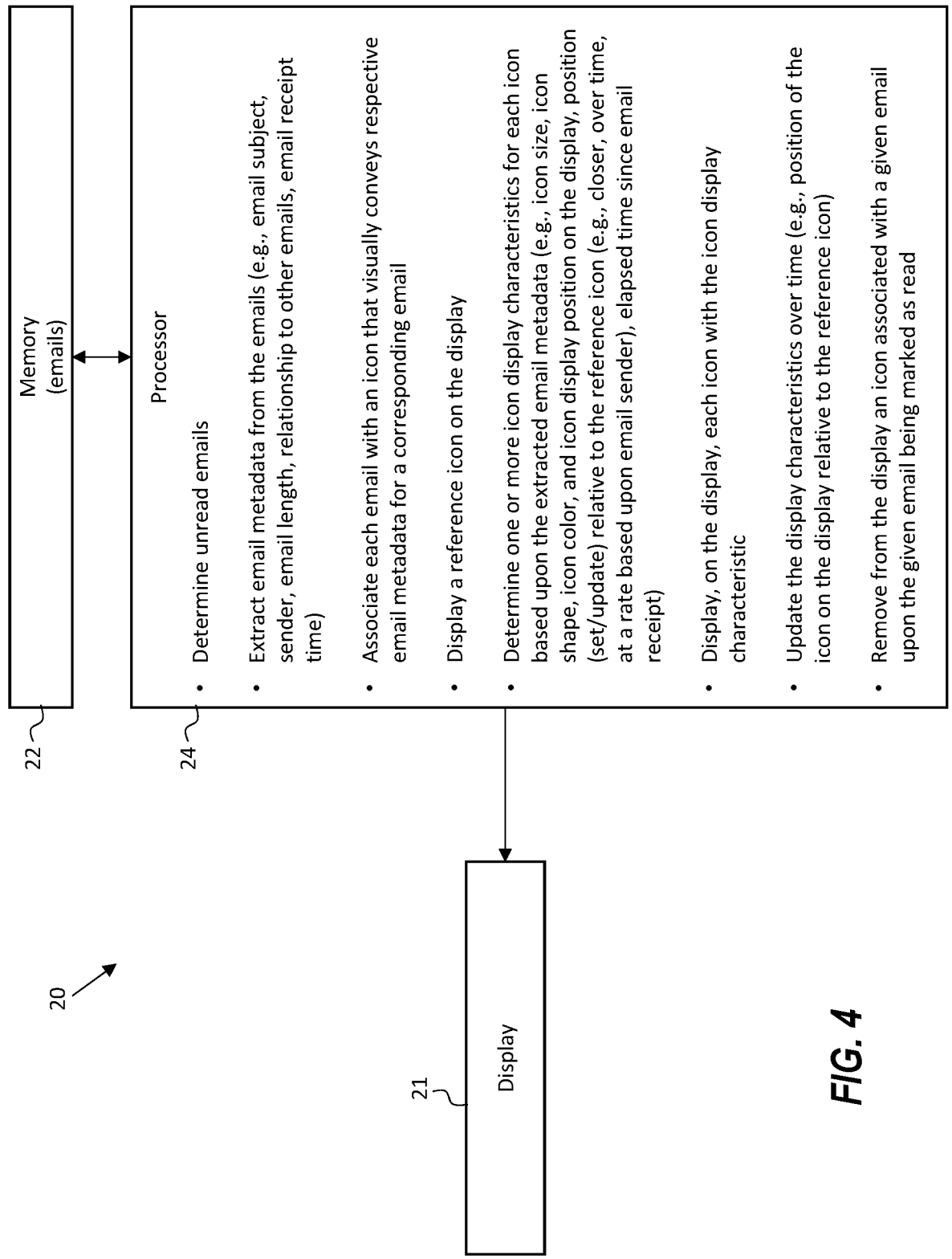
FIG. 4 is another schematic diagram of the system of FIG. 3.

Referring now to FIGS. 3 and 4, a system 20 for displaying electronic mail (email) metadata 26 includes a display 21. The system 20 also includes a memory 22 configured to store emails 23. A processor 24 is coupled the display 21 and the memory 22. It will be appreciated by those skilled in the art that the system 20 may be embodied as a personal computer, mobile wireless communications device (e.g., smartphone, tablet), or a server (e.g., an email server), or parts of multiple types of systems, for example.

The memory 22 may store emails 23 for multiple users, for example, in the case of an email server. The memory 22 may be a local memory, for example, in the case of a personal computer, smartphone or tablet, and store emails 23 downloaded from an email server (e.g., an inbox) for a given user. Of course, the memory 22 may be both a local memory and a server memory, and thus, the emails may be stored in both a local memory and the server memory.

Figure 5:
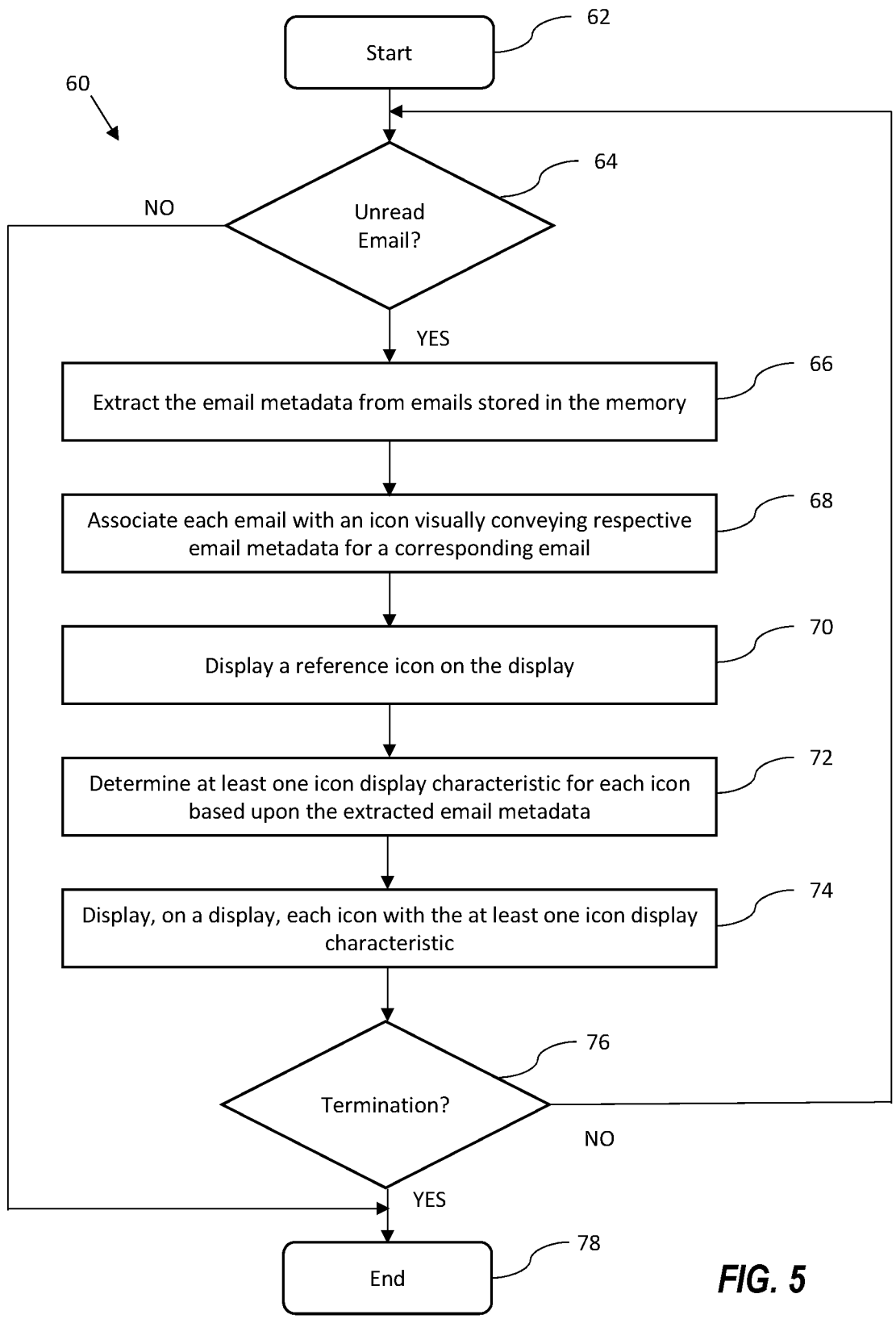
FIG. 5 is a flow diagram illustrating exemplary operation of the system in accordance with an embodiment.

Referring now additionally to the flowchart 60 in FIG. 5, operation of the system 20 will now be described. Beginning at Block 62, the processor 24 determines which emails 23, for example, associated with an email account of a user, are unread (Block 64). If, at Block 64, the processor 24 determines that there are no unread emails 23, the process may end (Block 78). In some embodiments, operations may return to Block 64, for example, to poll for unread email, for example, until terminated (e.g., closing of an email application or client).

At Block 66, when it is determined which emails 23 are unread at Block 64, the processor 24 extracts the email metadata 26 from the emails. More particularly, the processor 24 may parse the unread emails 23, both content or body and header data for the email metadata 26. The email metadata 26 may include one or more of email subject, sender, email length, relationship to other emails (e.g. part of same string/subject), and keyword data. Keywords may be set by the email user. The email metadata 26 may also include email receipt time. The email metadata 26 may include other and/or additional metadata, which may be directly acquired from each email and/or derived from data within or about the email. In some embodiments, the user may configure the processor 24 to extract specific metadata 26 and/or customize metadata to be extracted.

At Block 68, the processor 24 associates each email with an icon 25a-25n that visually conveys respective email metadata 26 for a corresponding email 23. In other words, each email may be assigned to an icon 25a-25n. The association may be with a new icon or an existing icon as in the case of an update, as will be described in further detail below.

The processor 24, at Block 70, displays a reference icon 27 on the display 21 or displayable area of the display, for example, at the center of the display or displayable area on the display. The reference icon 27 is illustratively in the form of a "+" sign and represents the user. The reference icon 27 may be in another form. A displayable area may be less than the entire display 21 (e.g., rectangular, circular), as will be appreciated by those skilled in the art.

The processor 24 determines one or more icon display characteristics 28a-28n for each icon 25a-25n based upon the extracted email metadata 26 (Block 72). Icon display characteristics 28a-28n may include any one or more of icon size, icon shape, icon color, and icon display position on the display 21. Of course, there may be other and/or additional icon display characteristics 28a-28n. In some embodiments, the user may determine or configure the processor 24 to set or correlate the icon display characteristics 28a-28n to specific email metadata 26. The icon display characteristics 28a-28n based upon the email metadata 26 may be considered to represent the priority of a given email.

The processor 24 displays, on the display 21, each icon 27 with the icon display characteristic 28a-28n (Block 74). More particularly, the processor 24 may display, when the email metadata 26 includes an email receipt time, the position of the icon 25a-25n on the display 21 relative to the reference icon 27. In other words, the newer the email or the less elapsed time since the email arrived in the inbox (e.g., in the memory 22), the farther away its respective icon 25a-25n may be from the reference icon 27.

If at Block 76, the processes have not been terminated (e.g., by the user, by closing an email client), the processor 24 updates the icon display characteristics 28a-28n by returning to Block 64. A determination of whether new unread emails 23 are in the memory 22 or inbox may be made. Metadata 26 from new unread emails 23 may be extracted at Block 66, and for existing unread emails, further or updated metadata may be extracted, and/or new or updated icon display characteristics 28a-28n may be determined (Block 72). New icons 25a-25n are displayed and/or existing icons are updated (Block 74). While illustratively the reference icon 27 is displayed at Block 70 upon an update, it will be appreciated by those skilled in the art that the reference icon may not be "re-displayed," but rather maintained on the display 21. Moreover, in some embodiments, the reference icon 27 may be displayed regardless of whether there are new emails 23.

The processor 24 may update the icon display characteristics 28a-28n based upon an interval (e.g., every minute, five minutes, etc.) or in real-time. For example, with respect to the email metadata 26 including email receipt time, the processor 24 may update the icon display characteristics 28a-28n of respective icons 25a-25n as time passes. In an embodiment, the processor 24 may update the icon display characteristics 28a-28n so the icons 25a-25n gravitate toward or become closer to the reference icon 27 over time or as the email ages in the user's inbox to show its relative importance or higher priority. Depending on settings, for example, from the user, the icons 25a-25n, may reach the reference icon 27 after 24-hours, or some other user-settable time. This may advantageously facilitate reading of emails 23 in that amount of time. If the user terminates the processes, the processes or operations end at Block 78.

In some embodiments where the email metadata 26 includes an email sender, the processor 24 may update the position on the display 21 of each icon 25a-25n relative to the reference icon 27 based upon email sender. More particularly, the processor 24 may update the position of a given icon 25a-25n to be closer to the reference icon 27 at a rate based upon the email sender. For example, if the sender is determined to be relatively important, as set and prioritized by the user, the processor 24 upon each update cycle may move the given icon 25a-25n closer the reference icon 27 compared to other icons. This gives the appearance that the given icon 25a-25n associated with the higher priority email, is approaching the reference icon 27 at a higher rate than other icons. Alternatively, or additionally, the emails 23 from a specific sender (e.g., a boss, CEO, etc.) may be marked with a particular icon display characteristic 28a-28n, for example, with a certain color and/or shape.

Figure 6:
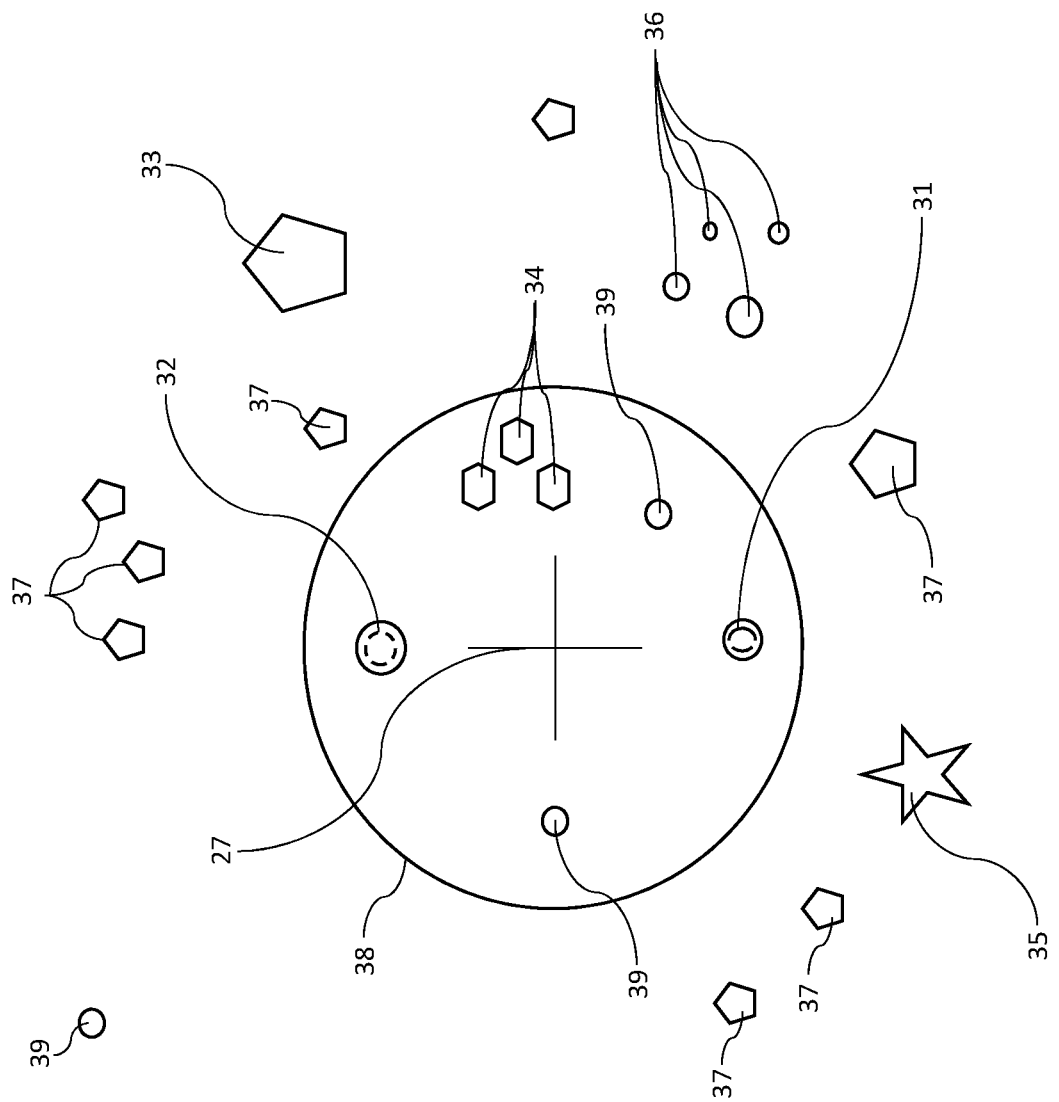
FIG. 6 is a diagram of an exemplary display including icons having icon display characteristics in accordance with an embodiment.

Referring now additionally to FIG. 6, illustratively, in an exemplary implementation, the icons 31 and 32 are associated with the user's boss and CEO, respectively and are shaped as a banded circle, with the CEO icon having a larger size than the icon corresponding to the boss.

In some embodiments, where the email metadata 26 includes email length, the size of the icons 25a-25n may correspond to the size of or length of the corresponding emails 23. For example, the bigger in size of a given icon 25a-25n, the longer the corresponding email in length. For example, in the exemplary implementation in FIG. 6, icon 33 corresponds to a longer, but less important email 23.

In embodiments where the email metadata 26 includes a relation to other emails, a cluster of related emails may be grouped visually. For example, icons 34, which are illustratively in the form of hexagons, may relate to support issues. Alternatively, the icons 25a-25n may be connected by lines or other indicia to show an explicit relation. Email relation (s) may be determined based upon explicit user input, e.g., by the user setting categories, and/or may be derived (e.g., automatically based upon keywords which are conceptually similar to categories). In some embodiments, the shape of an icon may be used to show which emails 23 belong to a certain group (e.g., triangles for group 1, squares for group 2, etc.). For example, a star-shaped icon 35 may correspond to an email about a bonus, while circle icons 36 may all relate to common grouping, and pentagon shaped icons 37 may be uncategorized emails 23 (FIG. 6). The closer the grouping of icons, the more related the corresponding emails 23 may be. For example, circular icons 36 may be more closely related than circular icons 39, which while related, may not be as closely related (FIG. 6). Of course, other grouping arrangements may be implemented.

In some embodiments, relatively short text strings may be displayed on the display 21 adjacent a corresponding icon 25a-25n (e.g., above, below, inside, based upon zoom distance) to further clarify the topic of the email. The text may be abbreviated to reduce clutter on the display 21 or in the display area. In some embodiments, rather than a short text string adjacent each icon 25a-25n, a scrolling readout (e.g., a ticker tape) may be displayed. This may permit the display or more information in a relatively small space, and in a few seconds of reading the user may read the first few sentences of the corresponding email.

As will be appreciated by those skilled in the art, once the icons 25a-25n representing emails 23 are visualized or displayed on the display 21, the user may provide input in the form of various gestures to perform various operations with respect to the icons or emails. For example, the user may "click and drag" to change the priority of an email or relate it to another email. The user may also "double-tap" the icon 25a-25n to open a window to respond to the email 23 corresponding to a given icon. The user may also "click once" on the icon 25a-25n to open a window to read the corresponding email 23. The user may also provide a "long press" on the icon 25a-25n to show a portion of the corresponding email 23 content on the screen (along with other email metadata like date and sender). The user may also "drag to trashcan" an icon 25a-25n to delete the icon and/or email 23. A "long press" followed by a "drag" may change one or more properties of the icon 25a-25n, for example, color, mark as read, etc.

When, for example, there are a relatively large number of icons 25a-25n being displayed on the display 21, it may be particularly difficult for the user to view all of the icons on the display at any one given time. To permit a relatively quick view of these icons 25a-25n, gestures in the form of input to an input device coupled to the processor 24 (e.g., mouse, touchpad, touch screen) may be used to navigate among the icons. Of course, other gestures may be made customized by the user and operate differently or in more than one manner with respect to a given icon or email 23. Exemplary gestures may include "pinch to zoom," "two-finger hold and slide" to pan, "three finger tap" to zoom out completely, and "four finger tap" to zoom in to show only relatively high-priority emails. In some embodiments, an auto zoom-pan mode may be used and depend on the number of icons 25a-25n or emails 23 and other factors, for example, icon clustering. For example, a relatively dense clustering of icons 25a-25n may collectively be zoomed-out or resized relative to other icons in the display 21.

In some embodiments, an icon 25a-25n, may represent a calendar appointment. For example, a relatively large circular graphic or icon 38 may show an upcoming appointment, for example, where the email metadata 26 includes calendar or meeting metadata. The circular graphic or icon 38 may be particularly helpful for permitting a user to figure out when certain emails 23 represented by icons 25a-25n should be read and/or answered with respect to certain meetings. Other type, shape, and/or size icons may be used to correspond to an appointment.

At Block 76, the processor 24 may remove from the display 21 an icon 25a-25n associated with a given email 23 upon the given email being marked as read. Those skilled in the art would appreciate that an email 23 may be marked as read based upon replying to the given email, deleting the given email, or moving the given email. In some embodiments, emails 23 that have been read, but where a response or reply is desired, the emails may be marked by the user as such and remain on the display 21. Emails 23 may also be reprioritized by the user, as desired.

A conceptual metaphor that conveys a visualization of the system 20 may be to consider the display 21 or displayable area similar to outer space (i.e., the universe), and each email 23 being a celestial body (star, planet, etc.). Each of the stars has a shape, size, color, and location that is dependent on metadata.

As described above, at the center of the rectangular space (displayable area) or on the display 21, the reference icon 27 represents the user (shown as a "plus sign" in the exemplary implementation (FIG. 6)). Icons or the metaphorical "stars," which represent emails 23 are shown around the reference icon 27 or user (FIG. 6). As described above, the distance to the reference icon 27 represents the priority of the email 23 (either manually set or derived by some heuristic), and the closer to the reference icon the metaphorical "star" is, the higher the priority the email may be considered. Indeed, the described visualization may be considered representative of all (or a subset) of unanswered/unread emails 23 and may be updated periodically (or in real time).

As will be appreciated by those skilled in the art, while traditional or conventional email clients permit email tagging or filtering, these conventional email clients may have relatively cumbersome or inefficient user-interface interaction. Moreover, while conventional email clients may provide the user with an email preview, for example, of its contents, to adequately comprehend the content of each email 23 requires tedious reading on the display 21.

Indeed, the system 20 described herein may, relative to conventional email clients for example, provide a visualization of a user's email inbox. The system 20 may advantageously display a user's inbox in a relatively intuitive visual presentation that can be understood at a glance, as well as manipulated with a reduced amount of user input or action. In other words, the system 20 may advantageously increase email processing efficiency and may increase user productively, particularly for users that receive an increased amount of email in a relatively short time period and for which a timely response thereto is desirable.

While embodiments described herein may be for visualizing or displaying email metadata 26 from a single email account, it will be appreciated by those skilled in the art that the system 20 may operate with respect to multiple email accounts, for example, for a given user or multiple users, all of which may be displayed on the display 21 at any one time. Of course, different icon display characteristics 28a-28n associated with each user and/or email account. For example, the icons 25a-25n may be displayed in 3-dimensions, which may permit displaying relatively more data or icons along the z-axis. As will be appreciated by those skilled in the art, a 3-dimension may be achieved using virtual or augmented reality to allow relatively easy navigation among the icons or associated emails 23. Moreover, the system 20, and more particularly, the operations described therein of the processor 24 may be part of or independent from an email client, for example, the Citrix Secure Mail™ client available from Citrix Corporation of Fort Lauderdale, Fla.

Those skilled in the art will appreciate that the functions described herein may be embodied with the functionality of an email client application and/or separately as a standalone application or process either at a server level and/or at a local (e.g., user device) level.

Figure 7:
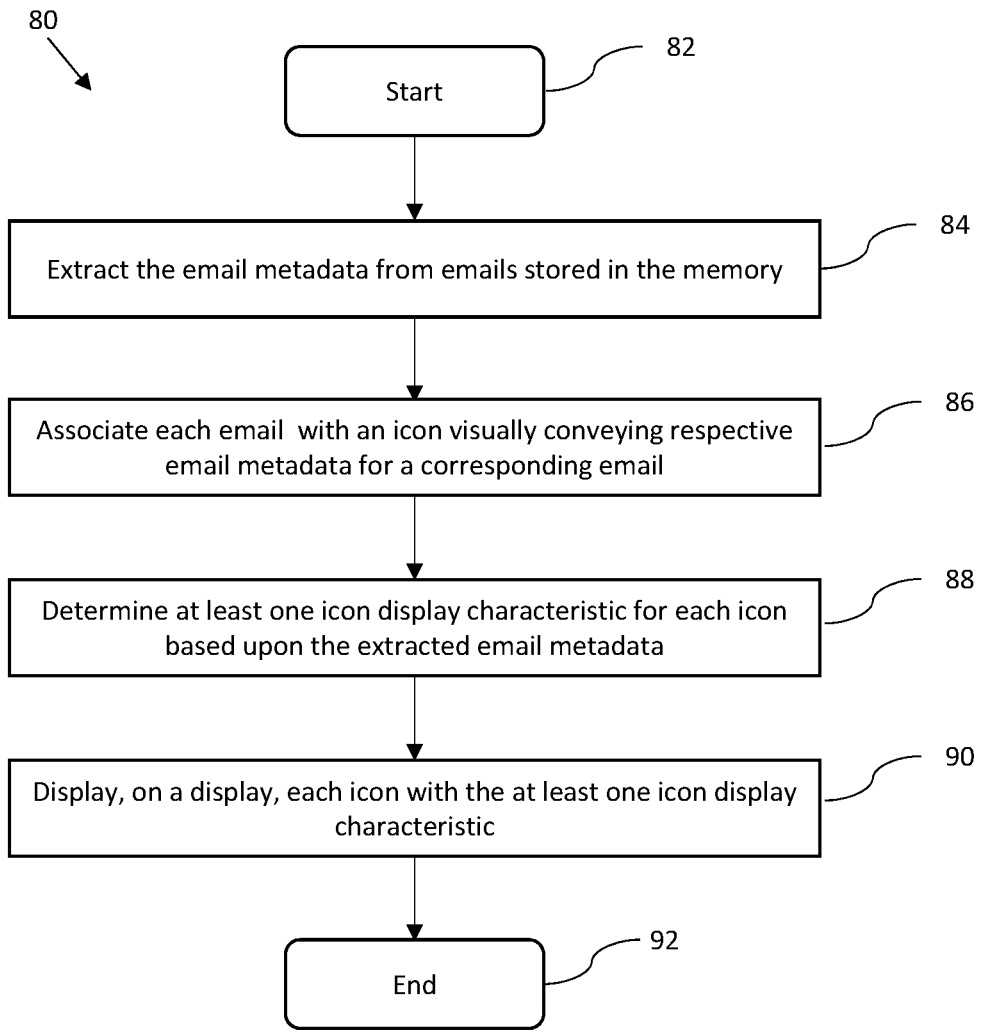
FIG. 7 is a flow diagram of a method of displaying email metadata in accordance with an embodiment.

Referring now to the flowchart 80 in FIG. 7, beginning at Block 82, a method aspect is directed to a method of displaying email metadata 26. The method includes using a processor 24 and memory 22 cooperating therewith to extract the email metadata 26 from emails 23 stored in the memory (Block 84) and associate each email with an icon 25a-25n visually conveying respective email metadata for a corresponding email (Block 86). At Block 88 the processor 24 cooperates with the memory 22 to determine at least one icon display characteristic 28a-28n for each icon based upon the extracted email metadata 26, and, at Block 90, display, on a display 21, each icon 25a-25n with the at least one icon display characteristic. The method ends at Block 92.

A computer readable medium aspect is directed to a non-transitory computer readable medium for displaying email metadata 26. The non-transitory computer readable medium includes computer executable instructions that when executed by a processor 24 cause the processor 24 to perform operations. The operations include extracting the email metadata 26 from emails 23 stored in a memory 22 coupled to the processor 24 and associating each email with an icon 25a-25n visually conveying respective email metadata for a corresponding email. The operations may also include determining at least one icon display characteristic 28a-28n for each icon based upon the extracted email metadata 26, and displaying, on a display 21, each icon with the at least one icon display characteristic.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system for displaying electronic mail (email) metadata, the system comprising:
a display;
a memory configured to store a plurality of unread emails; and
a processor coupled to the display and the memory, and configured to
display a reference icon on the display,
extract the email metadata from the plurality of unread emails, the email metadata comprising an email sender, the email sender having a priority associated therewith,
associate each unread email from the plurality thereof with an icon visually conveying respective email metadata for the associated unread email,
determine at least one icon display characteristic for each icon based upon the extracted email metadata, the at least one icon display characteristic comprising an icon display position on the display,
display, on the display, each icon with the at least one icon display characteristic,
for each icon, update the icon display position over time at a given time interval to be closer to the reference icon at a rate based upon the priority of the email sender so that upon each update, an icon associated with a higher priority email sender approaches the reference icon at a higher rate than icons associated with lower priority email senders,
display, on the display, the at least one icon with the at least one updated icon display characteristic, and
remove from the display, an icon based upon the associated unread email being read.

2. The system of claim 1 wherein the email metadata comprises an email receipt time, and wherein the processor is configured to set the position on the display of each icon relative to the reference icon based upon elapsed time since the email receipt time.

3. The system of claim 2 wherein the processor is configured to update the position on the display of each icon relative to the reference icon over time based upon the email receipt time.

4. The system of claim 3 wherein the processor is configured to update the position on the display of each icon to be closer to the reference icon over time.

5. The system of claim 1 wherein the email metadata comprises at least one of subject, email length, relationship to other emails, and keyword data.

6. The system of claim 1 wherein the at least one icon display characteristic comprises icon size; wherein the email metadata comprises email size; and wherein the processor is configured to set the icon size of each icon based upon the email size.

7. The system of claim 1 wherein the at least one icon display characteristic comprises icon shape; wherein the email metadata comprises an email subject; and wherein the processor is configured to set the icon shape based upon the email subject.

8. The system of claim 1 wherein the email metadata comprises keyword data; and wherein the processor is configured to set the position of each icon on the display based upon the keyword data.

9. The system of claim 1 wherein the at least one icon display characteristic comprises icon color; and wherein the processor is configured to set the icon color of each icon based upon the email sender.

10. A method of displaying electronic mail (email) metadata, the method comprising:
using a processor and memory cooperating therewith to
display, on a display, a reference icon,
extract the email metadata from a plurality of unread emails stored in the memory, the email metadata comprising an email sender, the email sender having a priority associated therewith,
associate each unread email from the plurality thereof with an icon visually conveying respective email metadata for the associated unread email,
determine at least one icon display characteristic for each icon based upon the extracted email metadata, the at least one icon display characteristic comprising an icon display position on the display,
display, on the display, each icon with the at least one icon display characteristic,
for each icon, update the icon display position over time at a given time interval to be closer to the reference icon at a rate based upon the priority of the email sender so that upon each update, an icon associated with a higher priority email sender approaches the reference icon at a higher rate than icons associated with lower priority email senders,
display, on the display, the at least one icon with the at least one updated icon display characteristic, and
remove from the display, an icon based upon the associated unread email being read.

11. The method of claim 10 wherein the email metadata comprises an email receipt time, and wherein using the processor comprises using the processor to set the position on the display of each icon relative to the reference icon based upon elapsed time since the email receipt time.

12. The method of claim 10 wherein the at least one icon display characteristic comprises icon size; wherein the email metadata comprises email size; and wherein using the processor comprises using the processor to set the icon size of each icon based upon the email size.

13. The method of claim 10 wherein the at least one icon display characteristic comprises icon shape; wherein the email metadata comprises an email subject; and wherein using the processor comprises using the processor to set the icon shape based upon the email subject.

14. A non-transitory computer readable medium for displaying electronic mail (email) metadata, the non-transitory computer readable medium comprising computer executable instructions that when executed by a processor cause the processor to perform operations comprising:
displaying, on a display, a reference icon;
extracting the email metadata from a plurality of unread emails stored in a memory coupled to the processor, the email metadata comprising an email sender, the email sender having a priority associated therewith;
associating each unread email from the plurality thereof with an icon visually conveying respective email metadata for the associated unread email;
determining at least one icon display characteristic for each icon based upon the extracted email metadata, the at least one icon display characteristic comprising an icon display position on the display;
displaying, on the display, each icon with the at least one icon display characteristic;
for each icon, updating the icon display position over time at a given time interval to be closer to the reference icon at a rate based upon the priority of the email sender so that upon each update, an icon associated with a higher priority email sender approaches the reference icon at a higher rate than icons associated with lower priority email senders;
displaying, on the display, the at least one icon with the at least one updated icon display characteristic; and
remove from the display, an icon based upon the associated unread email being read.

15. The non-transitory computer readable medium of claim 14 wherein the at least one icon display characteristic comprises icon size; wherein the email metadata comprises email size; and wherein the operations comprise setting the icon size of each icon based upon the email size.

16. The non-transitory computer readable medium of claim 14 wherein the at least one icon display characteristic comprises icon shape; wherein the email metadata comprises an email subject; and wherein the operations comprise setting the icon shape based upon the email subject.

* * * * *